(12) United States Patent
Abkairov

(10) Patent No.: US 11,750,668 B1
(45) Date of Patent: Sep. 5, 2023

(54) COMBINED ASYNCHRONOUS AND SYNCHRONOUS COMMUNICATION SYSTEM AND SERVICE WITH TRANSCRIPTION SUPPORT

(71) Applicant: Nikolay Abkairov, Los Altos, CA (US)

(72) Inventor: Nikolay Abkairov, Los Altos, CA (US)

( * ) Notice: Subject to any disclaimer, the term of this patent is extended or adjusted under 35 U.S.C. 154(b) by 0 days.

(21) Appl. No.: 17/354,749

(22) Filed: Jun. 22, 2021

Related U.S. Application Data

(60) Provisional application No. 63/042,928, filed on Jun. 23, 2020.

(51) Int. Cl.

| | |
|---|---|
| *H04M 3/00* | (2006.01) |
| *H04M 5/00* | (2006.01) |
| *H04L 12/66* | (2006.01) |
| *H04L 65/1096* | (2022.01) |
| *H04L 65/1053* | (2022.01) |
| *H04L 65/4038* | (2022.01) |
| *H04L 65/401* | (2022.01) |

(52) U.S. Cl.
CPC ...... *H04L 65/1096* (2013.01); *H04L 65/1053* (2013.01); *H04L 65/4015* (2013.01); *H04L 65/4038* (2013.01)

(58) Field of Classification Search
CPC .... H04M 7/006; H04M 2201/60; H04M 3/56; H04M 2201/40; H04M 3/533; H04M 1/2535; H04M 2203/4536; H04M 3/42382; H04M 3/42314; H04M 1/72436; H04M 2203/655; H04M 2250/74; H04M 3/42221; H04M 3/567; H04M 7/0045; H04M 2201/50; H04L 65/403; H04L 65/1016; H04L 12/1822; H04L 51/04; H04L 65/1069; H04L 12/1818; H04L 12/1827; H04L 12/66; H04L 12/1813; H04L 65/401; H04L 65/1046; H04L 51/216; H04L 65/1104; G10L 15/26; G10L 15/22; G10L 13/00; G10L 2015/223; G10L 15/00; G10L 19/00; G10L 25/63; H04W 4/14; H04W 4/12; H04W 4/16
USPC ....... 370/352, 353, 356, 401, 260, 261, 493, 370/351; 379/202.01, 88.13, 88.16, 88.18
See application file for complete search history.

(56) References Cited

U.S. PATENT DOCUMENTS

| | | | |
|---|---|---|---|
| 8,346,864 B1* | 1/2013 | Amidon | G06Q 10/10 709/224 |
| 2007/0223444 A1* | 9/2007 | Foo | H04M 3/42382 370/349 |
| 2009/0103695 A1* | 4/2009 | Katis | H04M 3/42221 379/93.01 |
| 2009/0286514 A1* | 11/2009 | Lichorowic | H04M 3/4938 455/412.2 |
| 2010/0251124 A1* | 9/2010 | Geppert | H04L 65/1069 715/835 |

(Continued)

*Primary Examiner* — Kharye Pope
(74) *Attorney, Agent, or Firm* — PATENT LAW WORKS LLP

(57) ABSTRACT

The present disclosure is generally related to integrating asynchronous text based and voice based communication between users on desktop and mobile devices with synchronous modes of communication, such as video or audio conferencing. More particularly, additional notifications, commands, and services may be provided to aid users to smoothly transition between different modes of operation, to adapt to varying conditions, and to reduce distraction caused by notifications.

16 Claims, 11 Drawing Sheets

(56) References Cited

U.S. PATENT DOCUMENTS

| | | | |
|---|---|---|---|
| 2010/0296417 A1* | 11/2010 | Steiner | H04L 67/1001 |
| | | | 370/260 |
| 2011/0007732 A1* | 1/2011 | Ward | H04M 3/42229 |
| | | | 370/352 |
| 2012/0115501 A1* | 5/2012 | Zheng | H04W 4/185 |
| | | | 455/456.1 |
| 2016/0165184 A1* | 6/2016 | Aaron | H04L 12/1822 |
| | | | 348/14.08 |
| 2018/0122378 A1* | 5/2018 | Mixter | H04N 21/47217 |
| 2018/0338038 A1* | 11/2018 | Ly | H04M 3/42008 |
| 2020/0143797 A1* | 5/2020 | Manoharan | G10L 15/16 |
| 2021/0400135 A1* | 12/2021 | Klaghofer | H04M 3/527 |

* cited by examiner

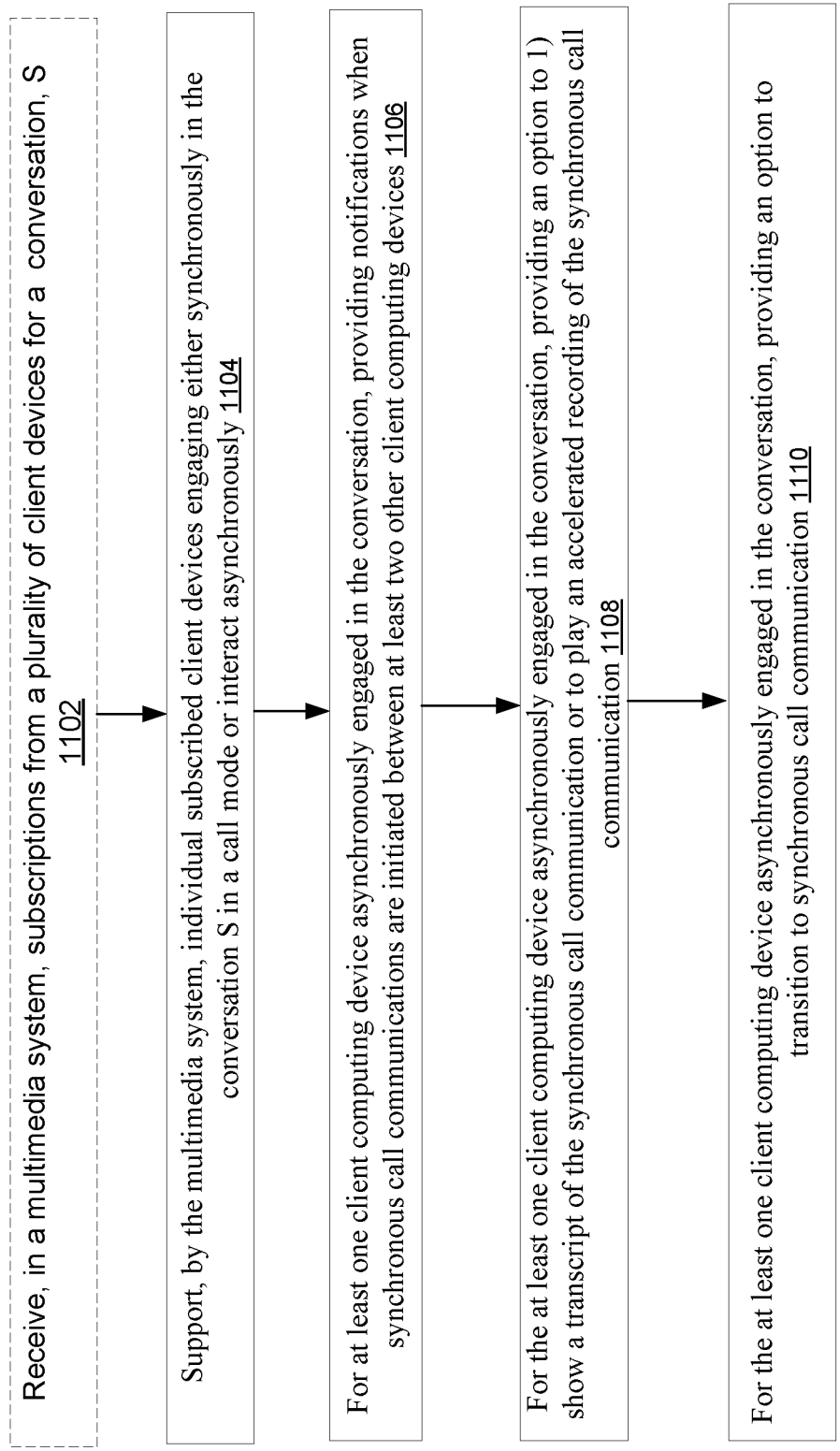

US 11,750,668 B1

COMBINED ASYNCHRONOUS AND SYNCHRONOUS COMMUNICATION SYSTEM AND SERVICE WITH TRANSCRIPTION SUPPORT

CROSS REFERENCE TO RELATED APPLICATIONS

The present application claims priority under 35 USC § 119(e) to U.S. Provisional Patent Application No. 63/042,928, entitled "Combined Asynchronous and Synchronous Communication Service with Transcription Support" and filed Jun. 23, 2020, which is incorporated herein by reference in its entirety.

TECHNICAL FIELD

The present disclosure is generally related to integrating asynchronous text based and voice based communication between users on desktop and mobile devices with synchronous modes of communication, such as video or audio conferencing. More particularly, additional services may be provided to aid users to smoothly transition between different modes of operation.

BACKGROUND

There are a number of communication services that allow users to exchange text messages, voice messages and video messages (asynchronous mode), as well as make a Voice-over-IP or Video-over-IP calls (synchronous mode). Examples of such services include Skype®, Slack®, etc.

There are a number of inconveniences when using either one of these modes of communications. In asynchronous mode, (1) a user may be interrupted too frequently by message notifications, (2) communication may be delayed due to users not willing to switch context and reply to a message immediately, (3) communication is not hands-free mode/distraction-free (if hands are busy or keeping focus is critical) and (4) discussing complex questions may require more real time communication such as a call. In synchronous mode, (1) users may not always be available to join a call, (2) users who can't join an ad-hoc call will miss out on its content or will be able to catch up only with a delay and (3) long calls may not be efficient due to loss of attention and some users attempting to multitask.

Some existing services try to solve some of these inconveniences by giving a user more control over notifications, and by performing transcription of a call, but: (1) the synchronous and asynchronous modes of communication still stay separate and transition between these modes is not smooth; (2) operating communication devices in hands-free/distraction-free mode is hard and (3) automatic transcription services (speech-to-text) do not have 0% word error rate which makes it harder to consume text generated from voice.

SUMMARY

A system integrating asynchronous text based and voice-media based communication between users on desktop and mobile devices with synchronous modes of communication, such as video or audio conferencing. Additional notifications, commands, and services may be provided as option to aid users to smoothly transition between different modes of operation, to adapt to varying conditions, and to reduce distraction caused by notifications.

An example of a system includes a server having adapters to interface between client applications of client computing devices of individual users and asynchronous text and multimedia messaging services, and at least one synchronous conferencing service. The system is configured to coordinate each client computing device participating in a conversation in either a synchronous duplex call mode via a synchronous conferencing service or interacting with the conversation via an asynchronous text or asynchronous multimedia messaging mode that includes at least one of asynchronous voice messaging and video messaging. The system supports individual client devices transitioning in a conversation from the asynchronous text or multimedia messaging mode to the synchronous duplex call mode. The system also supports user configurable voice commands and auditory notifications of messages and calls.

BRIEF DESCRIPTION OF THE DRAWINGS

The present invention is illustrated by way of example, and not by way of limitation, in the figures of the accompanying drawings and in which like reference numerals refer to similar elements and in which:

FIG. 11 is a flow diagram of another method of operating with at least two client devices, according to an embodiment of the invention.

DETAILED DESCRIPTION

Figure 1:
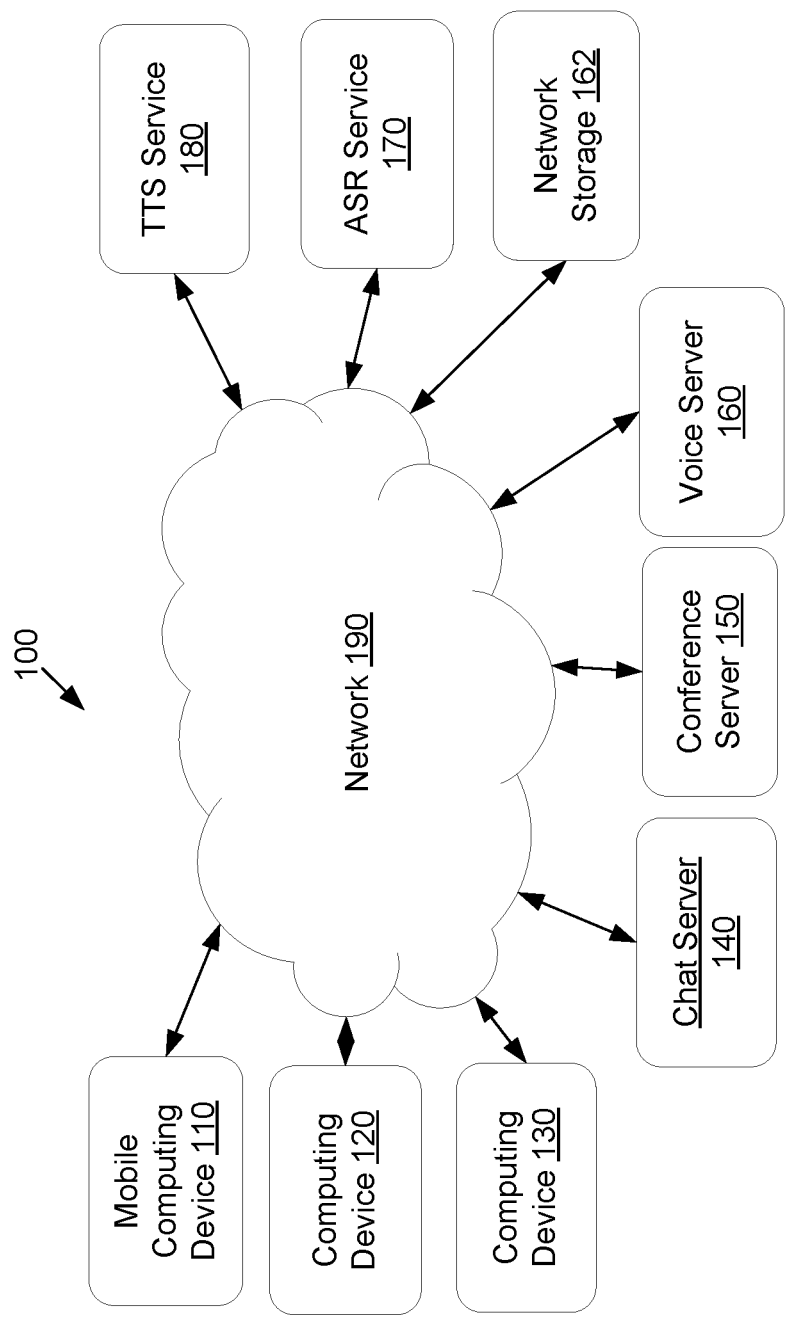
FIG. 1 is a block diagram that depicts an example communications system architecture 100, according to an embodiment of the invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

An exemplary system and method addresses a variety of overall goals that address problems like user fatigue, user frustration, and other inconvenience with using conventional conferencing tools such as Slack® and Skype®. These include: (1) reducing the interruption of a user due to message notifications, while at the same time; (2) making it easier for a user to process incoming notifications and take an action on some of them, such as making a voice reply or starting a call, in hands free fashion if necessary; (3) making it easier for a user to catch up on any missed messages in either text or voice form, and any missed or ongoing call in either text or voice form, and join an ongoing call being fully caught up.

Techniques are supported for making smooth transitions between asynchronous (e.g., text and voice messaging) and synchronous (e.g., live duplex conference audio call or video call) modes of communication. This can more generally include smooth transitions between asynchronous media messaging and synchronous media communication. For example, asynchronous media messaging may include asynchronous text messaging or asynchronous multimedia messaging (e.g., asynchronous voice messaging or video messaging). Synchronous media communication may, for example, include synchronous real time voice calls or synchronous video calls, or live streaming of such calls in real time.

Techniques are provided to reduce the interruption of a user due to message notifications, by playing these notifications as voice notifications, while at the same time enabling users to act or reply to these notifications using their voice, thus achieving shorter delay for asynchronous replies and providing ability to escalate an asynchronous exchange into a synchronous call.

In some implementations, user preferences in notifications and voice commands are taken into account. In some implementations, notifications are shown/played in a recipients preferred modality. For example, while listening to a notification regarding duplex call the recipient may reply to it with a voice command or voice reply, which is then streamed back to the sender and thus may create a loop of near-synchronous communication, which may be escalated to a full duplex real-time VoIP call. In some implementations, a user who joins this conversation later may catch up on any missed notifications in either text or voice form, and any missed or ongoing call in either text or voice form, and join an ongoing call being fully caught up.

Example Device and System Environment

FIGS. 1-5 illustrate examples of a device and system environment to support new modes of communication in accordance with an implementation.

FIG. 1 illustrates an example System environment 100 in which techniques for asynchronous and synchronous communication are integrated. System environment 100 includes user client computing devices, such as a mobile computing device 110 and computing devices 120 and 130 (which may, for example, include personal computers, laptop computers, tablet computing devices, smartphones, smart wearable glasses, smart helmets, smart watches, smart headsets, and smart speakers, which are used for user interaction). Each client device computing device may have a client application "Client App" (not illustrated in FIG. 1). Each client computing device includes at least one processor and memory to implement the Client App, user interfaces, and network interfaces.

Service-side components are included in FIG. 1 to support a variety of services. The server-side components may run in real or virtualized servers, either in the cloud or on-premise, connected to the Internet and to other cloud services.

A variety of different services may be integrated to support different modalities of synchronous conferencing modes of operation, asynchronous media messaging (e.g., text messaging or multimedia messaging such as voice messaging, and video messaging), and generating transcriptions. FIG. 1 illustrates a system environment 100 that includes a chat server 140, a multimedia conference server 150, a voice server 160, a network storage service 162, an Automated Speech Recognition (ASR) Service 170, a Text-to-Speech (TTS) Service 180, and a communication network 190, which enables communication between these entities. Communication network 190 may include, by way of example, the Internet. In FIG. 1, the process of speech recognition and text-to-speech synthesis, chat service, network storage, VoIP protocol and conference server is in itself known in the art and will not be discussed in further detail herein. One aspect of the system environment of FIG. 1 is that both synchronous and asynchronous communication mode are supported in various combinations of modalities, such as text, voice, and video.

Figure 2:
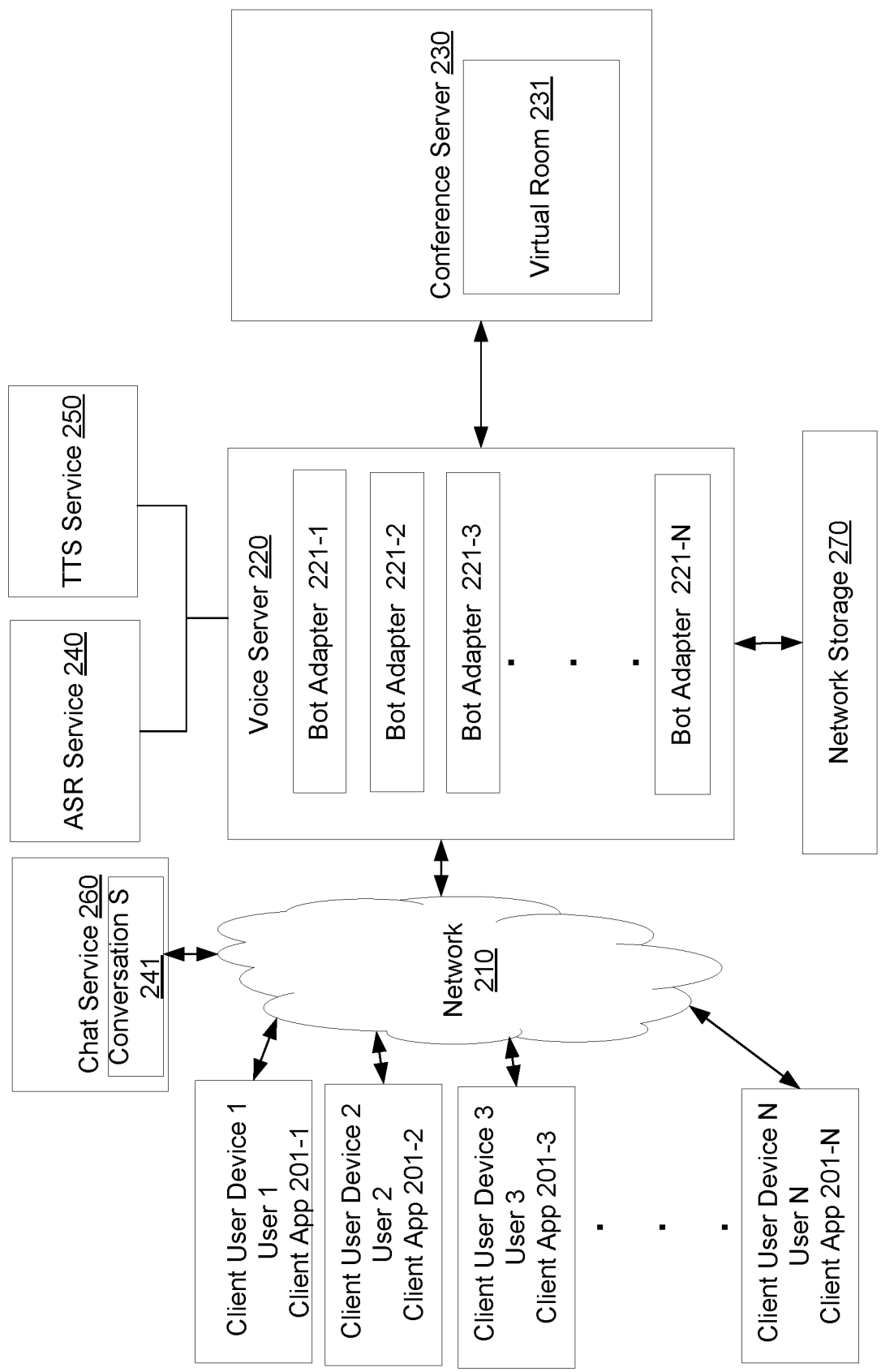
FIG. 2 is a block diagram that depicts an example of media flows in the communications system architecture 100, according to an embodiment of the invention.

FIG. 2 is a block diagram that depicts an example multimedia system architecture with detailed media flows. It shows, in more detail, an example in which there is a set of client user devices 201, where there may be an arbitrary number (e.g., 1, 2, 3, . . . N) of client computing devices, where each client computing device may be executing a respective version of the client app. (It will be understood in the discussion below that arbitrary number of user devices 201 may also be referred to using an alphabetical or alpha-numerical nomenclature (e.g., A, B, C, D . . . Z, A1, A2, . . . ). A network 210 is used for client computing devices to communicate via server-based components and services. A chat service 260 supports chat messaging for one or more conversations like conversation 241. A voice server 220 includes Bot adapters 221, which in one implementation corresponds to a Bot adapter for each Client App. However, it will be understood throughout the following discussion that more generally there may be other types of software implementation to perform the media streaming and notification functionality performed by the Bot adapters 221. As discussed below in more detail, the Bot adapters support new modalities of operation. The voice server 220 includes a network storage 270. An ASR service 240 and a TTS service 250 is in communication with, and by, the voice server 220. The voice server is also in communication with a conference server 230, which may include a virtual room 231 (also referred to as "Room S" below). There may, for example, be a ritual room, S, for each conversation. That is each individual conversation has an associated virtual room, S.

Figure 3:
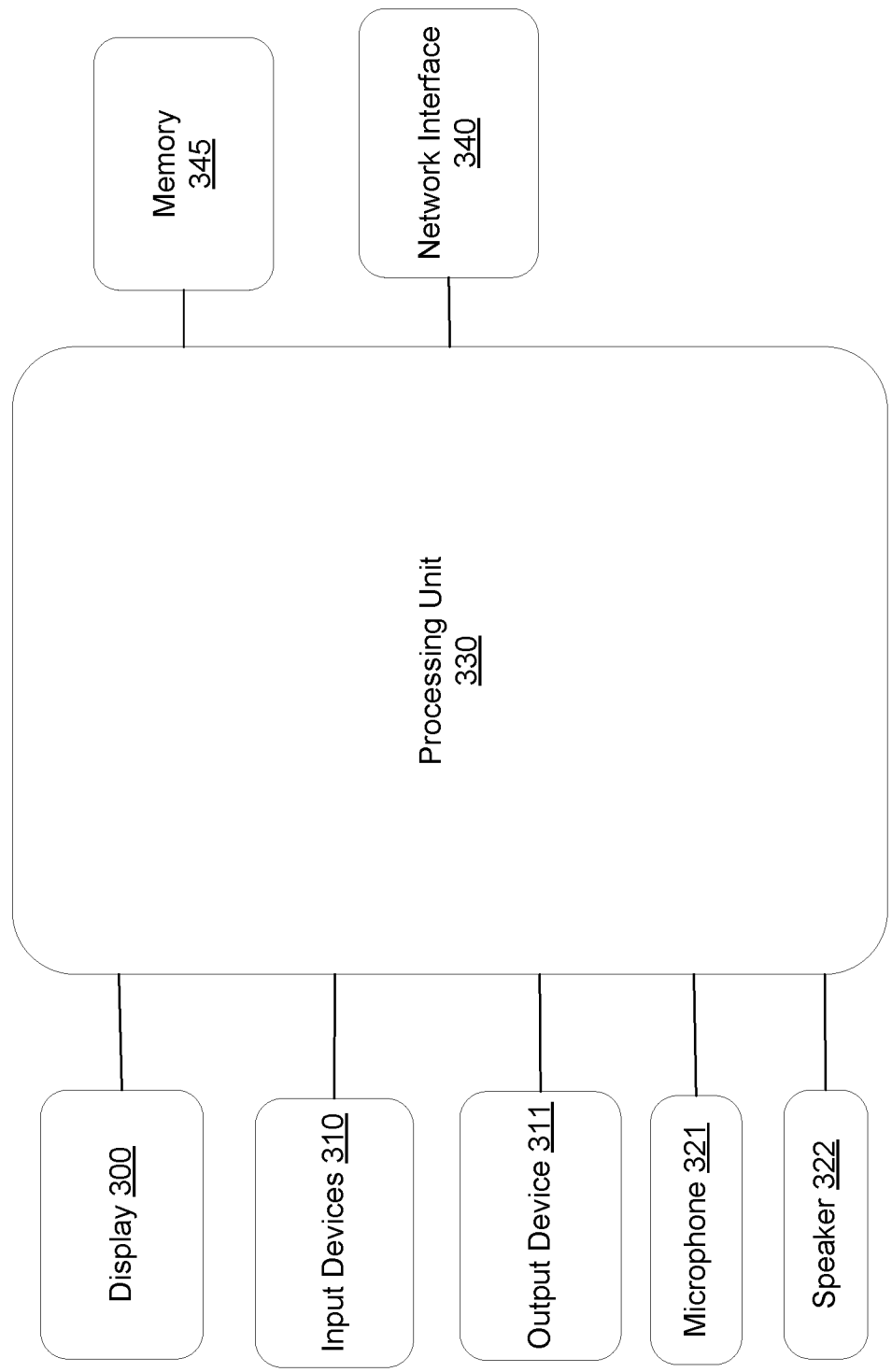
FIG. 3 shows an example device in which Client App may run, according to an embodiment of the invention.

FIG. 3 shows an example of an individual client computing device which has a microphone 321 to capture audio, a speaker 322 to play audio, a display 300 to show a Client App UI, input devices 310 (such as keyboard and mouse, or touch screen; also wireless input & control devices such as push-button) for user interaction with the UI and with the Client App, output devices 311 (such as vibration device to notify user via tactile feedback), a network interface 340 to connect to the Internet, a processing unit 330, and a memory 345.

Figure 4:
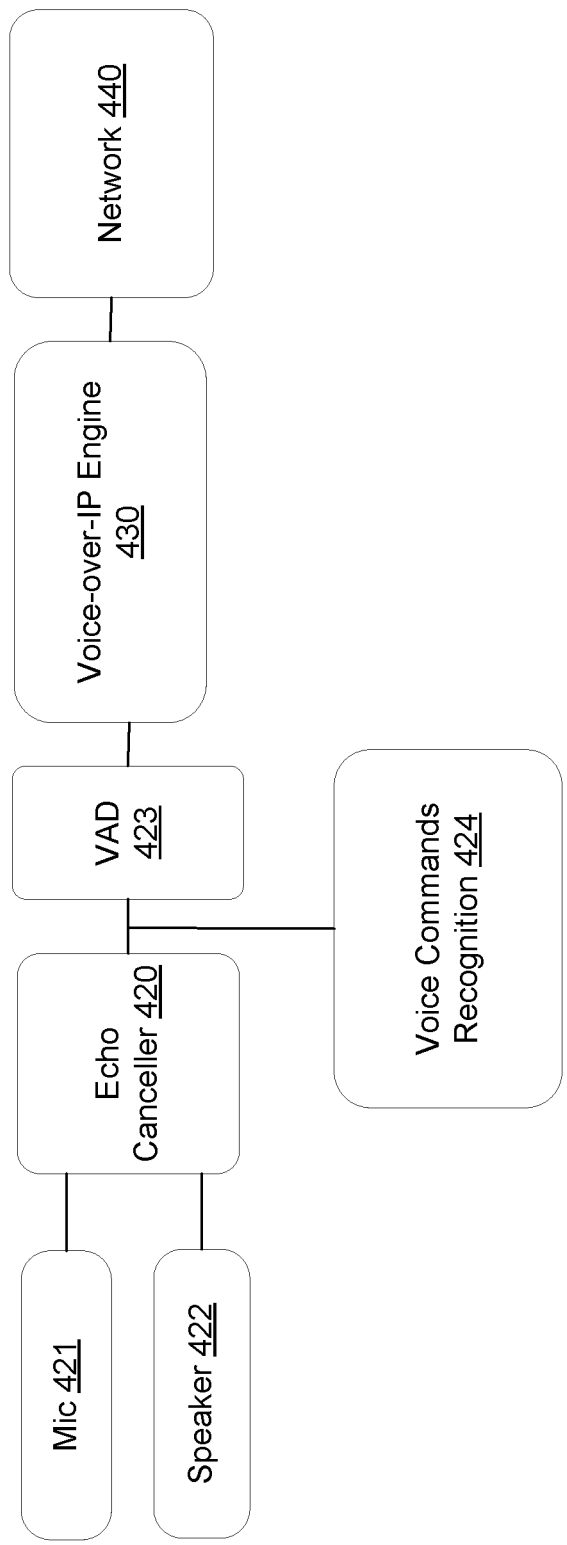
FIG. 4 shows Client App media flows, according to an embodiment of the invention.

FIG. 4 shows a block diagram of media flows for a Client App. For example the Client App media flows may include a microphone input signal 421, speaker output signal 422, an Echo Canceller to cancel echo coming into microphone from speaker 420, Voice Activity Detector (VAD) 423 to detect user voice activity, Voice Commands Recognition 424 to detect voice commands locally on a device to have shorter response time and to support intermittent network operation, a Voice-over-IP Engine 430 and a network driver 440.

The Client App may run as a standalone app in the OS, or inside of a browser. In both cases, Echo Cancellation 420 is run for the captured audio, which is either a part of an Operating System or a part of a browser. The process of echo cancellation, voice activity detection, voice command recognition, and voice-over-IP engine is in itself known in the art and will not be discussed in further detail herein.

Detection of user presence (ability of a user to listen to the voice notification played through speaker or headphones output 422), in addition to standard methods, is enhanced by monitoring of ambient noises in captured audio from microphone input 421, by monitoring wireless signal strength and motion of wearable devices and phones.

Figure 5:
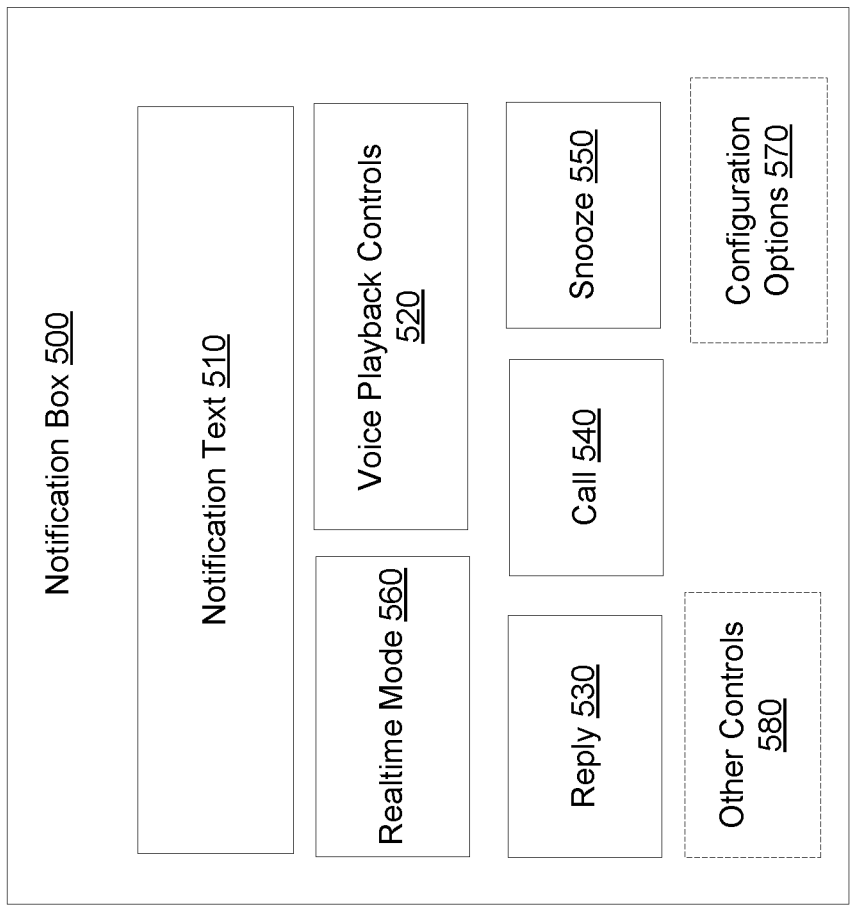
FIG. 5 shows a notification box UI with notification message, voice playback controls, and response buttons, according to an embodiment of the invention.

FIG. 5 is an example of a user interface (UI) for generating UI prompts and for a user to enter control commands. A notification box 500 may include a field for notification text 510, a real time mode controls/indicator 560, voice playback controls 520, a reply button 530, a call button 540, a snooze button 550, other optional controls 580, and optional configuration options 570.

One aspect of the system of FIGS. 1-5 is that the Client Apps 201 and Bot Adapters 221 support different modes of operation and configurations of notifications and voice commands as discussed in the description below. The system of FIGS. 1-5 may be implemented by a service provider integrating together different services from different service providers via, for example, a network-based or cloud-assisted service. However, more alternatively, features of the system of FIGS. 1-5 could also be integrated into, for example, an audio or video conferencing service to create an enhanced audio or video conferencing service.

Example Method of Operation

Figure 6:
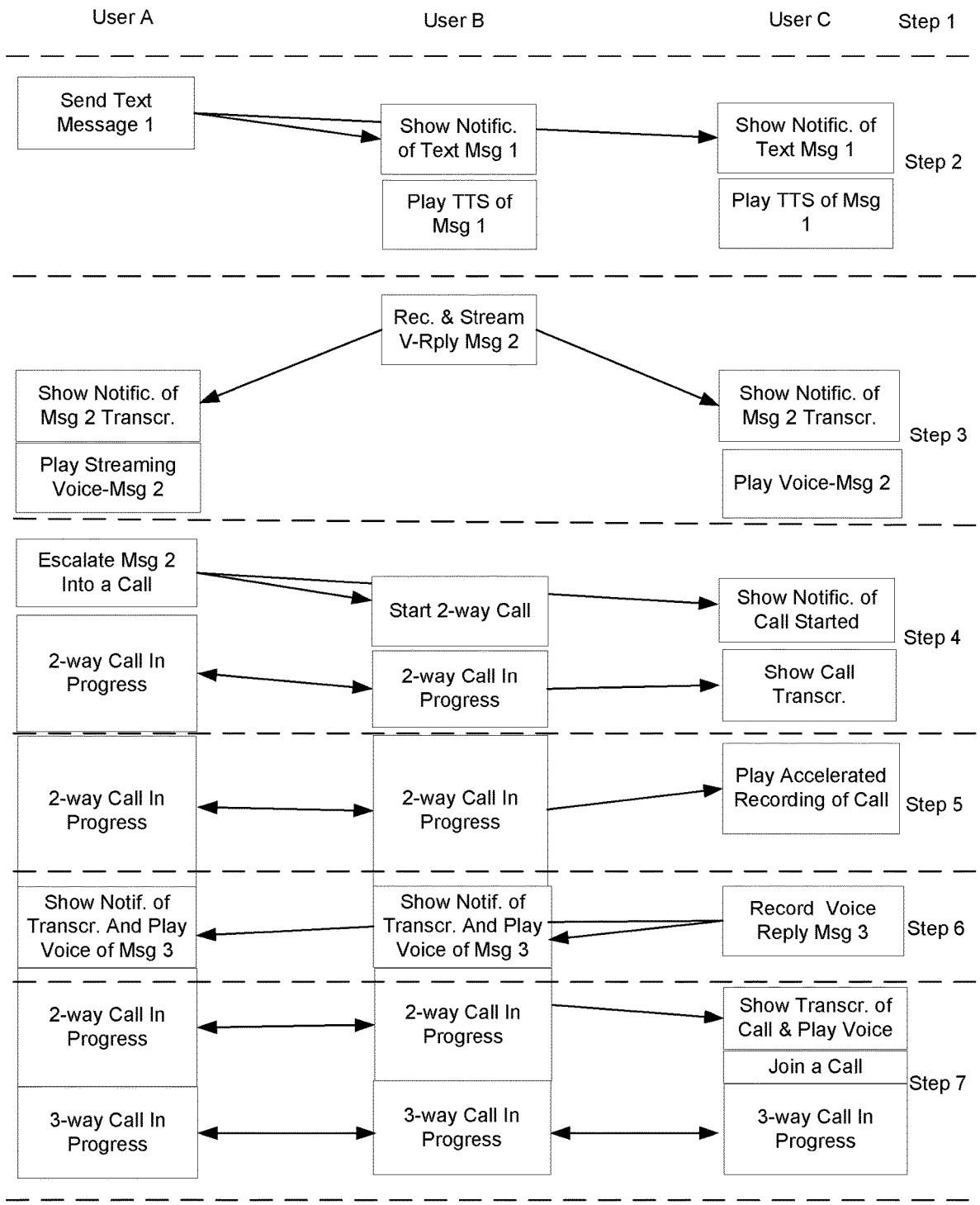
FIG. 6 is a flow diagram that depicts events of the asynchronous and synchronous modes of communications between users, according to an embodiment of the invention.

An example method of operation with seven steps is illustrated in FIG. 6. Background details for FIG. 6 are described in regards to Tables 1-5.

In one implementation, a variety of client voice modes are supported. Table 1 lists an example of Client Voice Modes and gives short names to them. The voice modes may include an idle mode, a new message being recorded, a voice notification being played, a reply message being recorded in response to a last communication, and starting a full duplex call.

TABLE 1

| Client Voice Modes | |
| --- | --- |
| Mode | Client State |
| 1 | Idle, no communications going on |
| 2 | A new message is being recorded |
| 3 | A voice notification is being played |
| 4 | A reply message is being recorded in response to the last notification |
| 5 | A full-duplex call has started |

Table 2 lists an example of configuration settings for voice commands. This includes, as examples, configuration settings for wake up words, delaying voice notification playbacks, allowing voice activation replies, and configuration of time delays for stopping recording or stopping a call after a selected period of silence. As another example, configuration settings may be provided for configuring real time indicators.

TABLE 2

| Configuration settings for voice commands | | |
| --- | --- | --- |
| Config Settings | Config Field Name | Value |
| Commands will be prefixed with wake-up word | WAKE_WORD | <WORD> or Voice File |
| Delay voice notifications playback if there's any user voice activity detected through the local microphone | DELAY_NOTIF_IF_ACTIVE | ON/OFF |
| Allow voice-activated replies to incoming notification; triggered only after a period of silence | VOICE_ACTIVATED_REPLY | ON/OFF |
| Allow voice-activated escalation to a full duplex call upon incoming notification, if incoming notification is streaming audio in real-time; triggered only after a period of silence | VOICE_ACTIVATED_CALL | ON/OFF |
| After a notification, expect commands for X sec | NOTIF_CMD_TIMEOUT | X sec |
| Stop recording after X sec of silence | REC_SILENCE_TIMEOUT | X sec |
| Stop a call after X sec of silence | CALL_SILENCE_TIMEOUT | X sec |
| Real-time mode indicators, per Table 6 - one or several modes may be selected at once | REALTIME_INDICATORS | UI TTS SOUND VIBRATION |

Table 3 lists an example of supported voice commands and associated actions in different modes. Table 3 illustrates that a wide variety of different voice commands may be supported for a user to control voice notifications, replies, controlling viewing transcripts of calls, controlling accelerated playback of calls, etc.

TABLE 3

Commands & Actions

| Command | Action | Modes |
|---|---|---|
| "OK", "Got it" | smoothly silence the current voice notification being played, marks it as read | 2-4 |
| "Stop it" | silence the current voice notification immediately and not play any new notifications from this user in this conversation unless 60 sec timeout expires from the last "stopped" message. The message should stay "unread". | 2-4 |
| "Snooze it" | snooze the voice notifications for the whole conversation for 5 minutes. The message and all following messages should stay "unread". | 2-4 |
| "Snooze for X min" | snooze the voice notifications for the whole conversation for X minutes. The message and all following messages should stay "unread". | 2-4 |
| "Snooze all" | snooze the voice notifications for the whole workspace for 5 minutes. The message and all following messages should stay "unread". | 1-4 |
| "Read messages" | Wake up from snooze mode, read the snoozed notifications/messages. | 1 |
| "Reply" | Reply back to the notification, by recording the audio that follows right after "Reply" command, until there's no voice activity for REC_SILENCE_TIMEOUT sec, or WAKE_WORD is spoken with commands "Over", "End of Message" or "Stop Recording". The original message should get "read" status. | 3 |
| <Any speech that's not a command> | if config VOICE_ACTIVATED_REPLY is OFF - do nothing; If config VOICE_ACTIVATED_REPLY is ON - start Replying just like with the "Reply" command. | 3 |
| <Any speech that's not a command> after 2 consecutive message Silence | If config VOICE_ACTIVATED_REPLY is OFF - do nothing; If config VOICE_ACTIVATED_REPLY is ON - start a real-time call in reply to an incoming message. If notification is played and there's no command from the listener - The message should stay "unread". | 3 |
| Silence for REC_SILENCE_ TIMEOUT Or WAKE_WORD with: "Over", "End of Message" or "Stop Recording" | Stop recording a message. | 2, 4 |
| "Cancel" | Cancel recording of a message | 2, 4 |
| "Let's talk" | reply back to notification by suggesting the author of the message to jump into a live call. The original message should get "read" status in Slack | 3, 4, 5 |
| "Talk to <Name>" | reply back to notification by suggesting the author of the message to jump into a live call. The original message should get "read" status in Slack | 1,3,4 |
| Silence for CALL_SILENCE_ TIMEOUT Or WAKE_WORD with: "Over", "End of Call", "Stop Call", "Stop Talking" | Stop ongoing call | 5 |
| "Off the record", "Stop recording" | Stop recording & transcription of a message or a call | 3, 4, 5 |
| "SpeedUp" | Accelerate voice message playback by 10-50% vs real-time. | 3 |
| "Slow Down" | Slowdown voice message playback by 10-50% vs real-time | 3 |
| "Repeat" | Roll back by approximately 15 sec, to the nearest voice inactivity and replay the voice message from that point in time. | 3 |
| "Skip" | Skip forward by approximately 15 sec, to the nearest voice inactivity and play the voice message from that point in time. | 3 |

TABLE 3-continued

Commands & Actions

| Command | Action | Modes |
|---|---|---|
| "Quieter" | Reduce the volume of the voice message being played | 3 |
| "Louder" | Increase the volume of the voice message being played | 3 |
| "Background" | Reduce the volume of the current and future voice messages being played from current conversation by 12 dB until conversation stops being active for at least 1 min. | 3 |

Table 4 lists an example of various sounds that may be used for event notifications. One aspect is that sounds can be provided to aid in providing a user with auditory prompts about new notifications, cancellation of commands, voice message status, and call status.

TABLE 4

Events Sounds

| Sound Name | Example Sound Type | Event | Modes |
|---|---|---|---|
| NEW_NOTIF | Waves sounds with fade in | New voice message is coming and will start playing in 3 sec. Fade in and 3 sec length allow to minimize interruption if a user wants to cancel notification. This sound is played only for the first message while a user is in Idle mode, where interruption is not desirable. | 1 |
| NOTIF_CANCEL | Waves sounds with fade out | Once command to cancel notification playback is received, play this sound to acknowledge it. | 1 |
| VM_START | Lower pitch, higher pitch, 0.5 sec | Voice message started playing - played only in-between consecutive messages, not for the first message | 3 |
| VM_STOP | Higher pitch, lower pitch, 0.5 sec | Voice message is done playing. | 3 |
| CALL_START | Lower pitch, Normal pitch, higher pitch, 0.7 sec | A call has started in a conversation | 1-5 |
| CALL_STOP | Higher pitch, Normal pitch, Lower pitch 0.7 sec | A call has stopped in a conversation | 1-5 |

FIG. 6 is an events flow diagram that depicts an example of events and message flows in accordance with an example. FIG. 6 and Table 5 illustrate an example of media flow configurations for an example of three client devices to illustrate how communication may progress from an idle state to various combinations of asynchronous and synchronous modes of communication. The example of Table 5 illustrates seven different steps for an example with three different users. However, more generally, many variations on the example of Table 5 are possible.

TABLE 5

Media Flow configurations for each of the steps

| Step # | Step Description | Routing |
|---|---|---|
| 1 | Users A, B & C are idle, no communications | Both user mics are listening for voice activity. In case of any voice activity, command is sent to a bot. Listen Route - always ON: User A mic ⇒ VAD ?⇒ Bot A ⇒ ASR User B mic ⇒ VAD ?⇒ Bot B ⇒ ASR User C mic ⇒ VAD ?⇒ Bot C ⇒ ASR |
| 2 | User A sends a text message (Msg 1) to User B in conversation S; a notification (notif.) of the text message may be shown to User B and a TTS version | TTS ⇒ Storage ⇒ Bot B ⇒ User B Storage ⇒ Bot C ⇒ User C |

TABLE 5-continued

Media Flow configurations for each of the steps

| Step # | Step Description | Routing |
|---|---|---|
| | played to User B; and a notification is shown and a TTS version played after some delay to User C. | |
| 3 | User B makes a voice reply to conversation S; voice of User B is streamed to User A as voice-reply Msg 2 and with some delay to User C. | ASR ⇒ Bot B ⇒ text to Conversation S<br>User B ⇒ Bot B ⇒ Storage<br>   Bot B ⇒ Bot A ⇒ User A<br>     Storage ⇒ Bot C ⇒ User C |
| 4 | User A escalates User B's reply to a 2-way call S with UserB, while User B's reply is still streaming. User C is provided with a notification that a call was started and may also be shown a call transcript (transcr.) | (switch from BotB⇒BotA route to BotB⇒Room S⇒BotA route should be done synchronously, with no frames lost or duplicated).<br>User B ⇒ Bot B ⇒ Storage<br>   Bot B ⇒ Room S ⇒ Bot A ⇒ User A<br>User A ⇒ Bot A ⇒ Room S ⇒ Bot B ⇒ User B<br>     Storage ⇒ Bot C ⇒ User C<br>   Bot A ⇒ ASR ⇒ text to Conversation S<br>   Bot B ⇒ ASR ⇒ text to Conversation S<br>     Room S ⇒ Storage |
| 5 | Users A & B are in a 2-way call; User C is listening in to a recording of their call S (with an optional acceleration of the recording), with some delay. | User B ⇒ Bot B ⇒ Room S ⇒ Bot A ⇒ User A<br>User A ⇒ Bot A ⇒ Room S ⇒ Bot B ⇒ User B<br>   Bot A ⇒ ASR ⇒ text to Conversation S<br>   Bot B ⇒ ASR ⇒ text to Conversation S<br>     Room S ⇒ Storage<br>       Storage⇒Bot C⇒User C |
| 6 | User C records a voice reply to Users A & B, and the voice of User C is streamed to the 2-way call S of Users A & B, with a voice message transcription shown to Users A&B | User B ⇒ Bot B ⇒ Room S ⇒ Bot A ⇒ User A<br>User A ⇒ Bot A ⇒ Room S ⇒ Bot B ⇒ User B<br>   Bot A ⇒ ASR ⇒ text to Conversation S<br>   Bot B ⇒ ASR ⇒ text to Conversation S<br>User C ⇒ Bot C ⇒ Storage<br>User C ⇒ Bot C ⇒ ASR ⇒ Bot C ⇒ text to Conv. S<br>   Bot C ⇒ Room S or<br>   Storage ⇒ Room S |
| 7 | User C may be shown a new portion of the transcript of the call. User C joins the call S to form a 3-way call. | User B ⇒ Bot B ⇒ Room S ⇒ Bot A ⇒ User A<br>User A ⇒ Bot A ⇒ Room S ⇒ Bot B ⇒ User B<br>User C ⇒ Bot C ⇒ Room S ⇒ Bot C ⇒ User C<br>   Bot A ⇒ ASR ⇒ text to Conversation S<br>   Bot B ⇒ ASR ⇒ text to Conversation S<br>   Bot C ⇒ ASR ⇒ text to Conversation S |

FIG. 6 illustrates in more detail the seven different steps of Table 5. The example includes three users: User A, User B, and User C, with corresponding client computing devices and Client Apps. The additional arrows are provided to aid in understanding media flows in each step. The following abbreviations are used in FIG. 6: "Notific." for Notification, "Msg." for Message, and "Transcr." for Transcript.

In Step 1 of FIG. 6, each of the users A, B, and C are not actively communicating, and so their Client Apps (respectively 201-A, 201-B, and 201-C) are in idle mode M1 per Table 1. In this example, there are also corresponding Bot adapters (221-A, 221-B, and 221-C). In Step 1, each respective Client Apps 201-A, 201-B, and 201-C are capturing audio from their respective microphone, waiting for voice activity, which is detected using the Voice Activity Detector (VAD) 423 of FIG. 4. If voice activity is detected at a client computing device (e.g. by a VAD 423), audio from the corresponding Client App is sent over the network (e.g., using, for example, a VoIP protocol) to the corresponding Bot Adapter of Voice Server 220. Command recognition is then performed based on expected commands from Table 3.

In Step 2 of FIG. 6, the Client App 201-A of User A captures the user's keyboard inputs, which are sent as a text message to Chat Service 260, entering into Conversation S 261. Voice Server 220 receives a notification about a new text message in one of the conversations to which it's subscribed (Conversation S in this case), and launches a process of transforming it from text form to speech via TTS Service 250, stores the TTS Service result into Network Storage 270, and notifies all of the participants of that conversation, except for the sender (in this case notifying Client App 201-B and Client App 201-C) via Voice Message Notification by first playing the sound NEW_NOTIF from Table 4 and then playing this notification via corresponding Bot Adapters (in this case Bot Adapter 221-B and Bot Adapter 221-C), which in turn stream this voice message to corresponding Client Apps via VoIP protocol.

If, for example, User C is away or busy at the moment (e.g., has notifications temporarily paused or is receiving another voice notification or is in a call), its Bot Adapter 221-C will play the notification for User C later, by reading it from the Storage 270.

In Step 3 of FIG. 6, while User B is still listening to the notification from Step 2 or has just finished listening to it, User B starts replying to this message, by either saying a "Reply" command from Table 3 or by just starting to speak (if config settings VOICE_ACTIVATED_REPLY from Table 2 is ON), or by pressing a button 530 in the notification UI prompt 500. User B's audio gets recorded by the microphone of Client App 201-B. In one implementation, the echo from notification gets cancelled in that recording, and the recording is streamed to Bot Adapter 221-B over VoIP protocol. In one implementation, Bot Adapter B sends this audio to ASR Service 240, where it gets transcribed, and resulting transcription is sent back to Bot Adapter 221-B, which in turn sends it to Chat Service 260, Conversation S 241. At the same time, Bot Adapter 221-B stores this audio stream to Storage 270. Bot Adapter 221-A gets an event that there's a new voice message being recorded for Conversation S 241, subscribes to a live stream of that voice message from Bot Adapter 221-B, plays VM_START sound from Table 4 and starts streaming that voice message to its Client App 201-A. Bot Adapter 201-C gets an event that there's a new voice message being recorded for Conversation S 241, but because User C is away or busy, it queues this event and acts on it later, with some delay, by replaying this message from the Storage 270. During the delayed replay of the message, Client App 201-C produces real-time mode indicators per REAL-TIME_INDICATORS setting from Table 2, to tell User C how far away the playback is from real-time of the live stream, to facilitate catching up if real-time conversation is still possible.

In Step 4 of FIG. 6, while User B is still replying and the reply is being streamed to User A, User A can decide that instead of replying asynchronously back and forth, it's more productive to talk in real-time, so User A escalates the incoming reply to a real-time full duplex call, either by saying "Let's talk" command from Table 3 or just by starting to speak (if config settings VOICE_ACTIVATED_CALL from Table 2 is ON), or by pressing a button 540 in the notification UI prompt 500.

Upon the command to escalate to a real-time call, several things happen:
1) User B's audio gets redirected in a transactional fashion (to avoid any packet loss) from a Bot-to-Bot route ("Bot Adapter 221-B to Bot Adapter 221-A") into Bot-Room-Bot route ("Bot Adapter 221-B to Conference Server 230, Room S 231 to Bot Adapter 221-A) as seen in Table 5, Step 4 and in FIG. 2, and Client App 201-A receives audio uninterrupted from Bot Adapter 221-A.
2) Bot Adapter 221-B sends a sound notification CALL_START (Table 4) to Client App 201-B to notify User B that their reply was escalated into a call, and that another user is ready to discuss it live.
3) User A audio starts streaming from Client App 201-A to Bot Adapter 221-A, which in turn relays it to Conference Server 230/Room S 231 and then to Bot Adapter 221-B and then to Client App 201-B.
4) User A's audio is also sent from Bot Adapter 221-A to Storage 270 for recording purposes, and to ASR Service 240, where it gets transcribed, and the resulting transcription is sent back to Bot Adapter 221-A, which in turn sends it to Chat Service 260, Conversation S 241.
5) Bot Adapter 221-C gets an event that there's a new call started in Conversation S and sends a sound notification CALL_START to User C, who at that time may be listening to a voice message from User B with some delay, being replayed from the Storage 270. User C at that time may decide to join the call as well, or continue listening to the messages in asynchronous fashion, but with some acceleration in the voice stream as compared to real time, to catch up on the conversation, by using commands "Speed Up" or "Skip" from Table 3.

At the same time, Bot Adapter 221-B continues sending it's media stream to Storage 270 for recording purposes, uninterrupted, and to ASR Service 240, where it gets transcribed, and resulting transcription is sent back to Bot Adapter 221-B, which in turn sends it to Chat Service 260, Conversation S 241.

In Step 5 of FIG. 6, User A and User B continue communicating via a synchronous call, with their media streams being sent and received via corresponding Bot Adapters to and from Conference Server 230, Room S 231, while also recording these 2 streams to Storage 270 and also sending these 2 streams to ASR Service 240, where it gets transcribed, and the resulting transcription is sent back via corresponding Bot Adapters to Chat Service 260, Conversation S 241.

User C finishes listening to an earlier voice message from User B and starts listening to the recording of the call with some delay, still trying to catch up into real-time. Bot Adapter 221-C streams recording of a call (time-synchronized recordings of User A and User B) from Storage 270 to Client App 201-C.

In Step 6 of FIG. 6, User C has caught up to real-time of the call, and wants to comment about something in the discussion, but is not yet ready to jump into a synchronous call. User C starts recording the reply by either saying a voice command "Reply" from Table 3 or by just starting to speak (if config settings VOICE_ACTIVATED_REPLY from Table 2 is ON), or by pressing a button 530 in the notification UI prompt 500; User C audio gets recorded by the microphone of Client App 201-C, echo from ongoing call notification gets cancelled in that recording, and is streamed to Bot Adapter 221-C over VoIP protocol. Bot Adapter C sends this audio to ASR Service 240, where it gets transcribed, and the resulting transcription is sent back to Bot Adapter 21-C, which in turn sends it to Chat Service 260, Conversation S 241. At the same time, Bot Adapter C stores this audio stream to Storage 270. Bot Adapter 221-A and Bot Adapter 221-B get an event that there's a new voice message being recorded for Conversation S 241, and start playing a NEW_NOTIF sound from Table 4 once there's a short period of silence in the call. If one of the Users A and B cancels or stops voice notification by saying "Cancel" or "Stop it" voice command, it gets stopped for all users in the call. If notification is not cancelled or stopped, Bot Adapter 221-C starts streaming User C voice message from Storage 270 to Conference Server 230, Room S 231, but all users in the call have an option to cancel or stop it. Replying directly to such message played in a call is not necessary, as reply can be done from inside of the call. At the end of User C voice message playback, Bot Adapter 221-C plays VM_STOP sound to indicate the end of a message.

In Step 7 of FIG. 6, User C is finally ready to join the call and does so by either saying a voice command "Let's Talk" from Table 3 or just by starting to speak (if config settings VOICE_ACTIVATED_CALL from Table 2 is ON), or by pressing a button 540 in the notification UI prompt 500.

All 3 users now are communicating via a synchronous call, with their media streams being sent and received via corresponding Bot Adapters to and from Conference Server 230, Room S 231, while also recording these 3 streams to Storage 270 and also sending these 3 streams to ASR Service 240, where it gets transcribed, and resulting transcription is sent back via corresponding Bot Adapters to Chat Service 260, Conversation S 241 for discoverability and history purposes.

In one implementation, users have an option to customize notification sounds from Table 4, making them custom for specific conversations and/or for specific users. Users will also have an option to customize their TTS voices. These customizations help differentiate notifications between conversations and between users.

Mode Indicators

Many variations on the operation of the client computing devices is supported. Another example of a method is for the scenario of two or more users, at respective client computing complication. Bot Voice TTS can be played before a message or a part of a message, or in parallel with a message in one of the stereo channels. Sounds and Vibrations can be played during the playback of a message.

TABLE 6

Examples of various indicators to tell the user of current message real-time mode

| Real-time Mode | Name | Notification UI | Bot Voice TTS | Sounds | Vibrations |
|---|---|---|---|---|---|
| No delay - live | LIVE_MODE | Live presence indicator - green dot | "Live" spoken by soft high-pitch (female) voice | High frequency short bursts | Very short vibration |
| Delay is over 5 sec, but sender is still live | DELAYED_MODE | Delay indicator - number of seconds to get to live | "X seconds to live" | Short bursts with increasing frequency as delay decreases, with a doppler effect as if something is approaching | Single periodic vibrations that get shorter and delay decreases increasing |
| Sender is not live | OFFLINE_MODE | Offline indicator - orange or grey dot | "Sent X seconds ago" | Low frequency short bursts | 2 long vibrations | devices, who want to communicate hands free in a group voice/video chat that supports both synchronous and asynchronous communication. As an example, these users may preemptively select the group or conversation that they all want to be a part of for the purpose of this hands-free chat. Also, to simplify this example, all users have selected the settings parameter VOICE_ACTIVATED_REPLY set to ON.

In this example, User A may start sending a voice/video message by either saying a wake up word, or by pressing a push-to-talk button (that may be one of the input devices 310 of a computing device from FIG. 3, including standalone wireless and/or wearable button).

User A's message will be streamed to other recipients via Bot Adapter 221-A to Bot Adapter 221-B & Bot Adapter 221-C route, with some recipients (e.g., User C) receiving it with some delay via Bot Adapter 221-A to Storage 270 to Bot Adapter 221-C route due to user being busy (delaying notification via stop/snooze commands; listening to previous messages) or due to network intermittent connectivity.

During playback of the message, Client Apps will produce real-time mode indicators per REAL-TIME_INDICATORS setting from Table 2 with values from Table 6, to tell a user how far away the playback is from real-time of the live stream, to facilitate catching up if real-time conversation is still possible.

If a user starts listening to a message that's streamed live and the real-time delay is low, such a message may be prefixed with a LIVE_MODE indicator. If a user is listening to a message that's no longer live, such message may be prefixed with an OFFLINE_MODE indicator. If a user is listening to a message that's live but real-time delay is over 5 sec, the DELAYED_MODE may be played periodically indicating new delay values as a user catches up more into real-time.

Table 6 shows several examples of indicators that can be used to tell the user of the current message real-time status. Real-time mode 560 can be shown on a display 500, as part of Notification Box 500, or as part of the watch face In this example, User B is able to receive the stream from User A in real-time, and as User B speaks something, due to VOICE_ACTIVATED_REPLY mode, this message immediately gets streamed to other users, including User A, who gets it in real-time, as if it's a full duplex call.

However, for the User C, who is receiving a message from User A with some time delay, the new message from User B will be played also with a delay, at a timestamp that corresponds to the time in User A's message when User B's response was added, as if User C is listening to their full duplex call with some delay.

Once User C is able to catch up with messages from Users A & B in a faster-than-real-time fashion, User C does it by listening to an accelerated version of User A & B messages (using "Speed Up" command from Table 3) and by skipping through unimportant parts (using "Skip" command).

In this example, User C keeps getting DELAYED_MODE indicator from Table 6 that indicates decreasing delay, until that indicator becomes LIVE_MODE and stops getting repeated. User C can use this indicator to gauge the timing of the reply, where, if it's DELAYED_MODE or OFFLINE_MODE mode, User C may wait with the reply until fully listening to all of the messages—so this is more like walkie-talkie push-to-talk messaging; but, if it's LIVE_MODE, User C is able to speak up and interrupt other speakers at any time—so this is more like a real-time call mode.

Additional Example Methods

Figure 7:
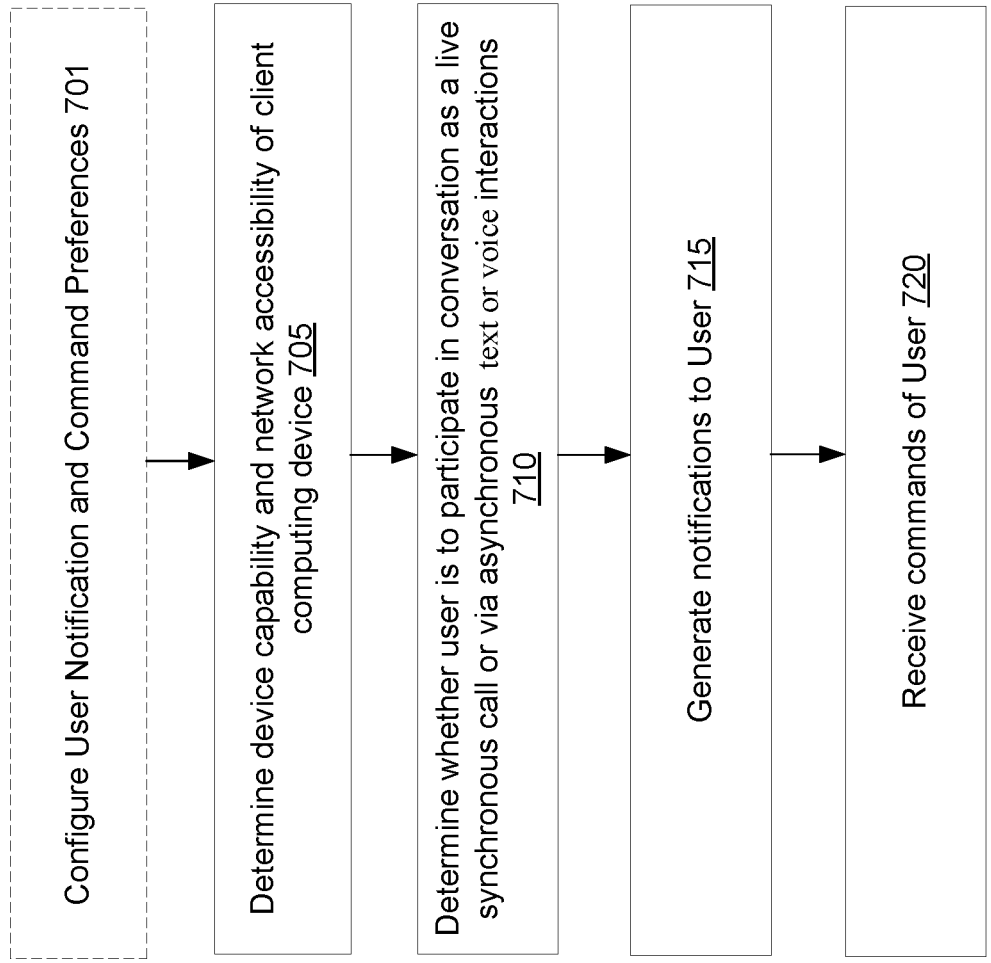
FIG. 7 is a flow diagram of a high-level method of generating notifications and receiving commands taking into account user configurations, user preferences, device capability, and network accessibility, according to an embodiment of the invention.

Many variations on the above-described method flows are supported. FIG. 7 is a flow diagram of an example method in which device capabilities and network accessibility are taken into account. For example, a user may have different client devices (e.g., smart watch, notepad computer, smartphone, and laptop computer). The network accessibility (e.g., bandwidth, latency) that may vary, such as when the user is traveling or resides in an area with lower-quality network access. As illustrated in block 701, in an optional pre-step, a user may configure user notifications and command preferences. In block 705, the system determines device capability and network accessibility of client computing devices. For example, the system may determine the client computing device type (e.g., smartwatch, smartphone, notepad computer, laptop computer, etc. and Client App version). As another example, the network quality (e.g., bandwidth) of the client computing device may also be determined. As other examples, geolocation of a smartphone may be used to determine user preferences (e.g., if geolocation indicates the user is at home, an inference may be made about a preferred user-device and corresponding device capabilities and user preferences). In block 710, a determination is made whether a user is to participate in a conversation as a live synchronous call or via asynchronous text or voice interactions. For example, suppose as an example that a user is taking a day off skiing. There may be limited network bandwidth. The user may have available to them a device with limited capabilities (e.g., a smartwatch). The user may also have preferences for whether they are to be available for voice calls. Various factors may be taken into account in determining whether a user is to participate in a conversation as a live synchronous call or asynchronous text or voice interactions. This may include, for example, monitoring of ambient noises in captured audio, by monitoring wireless signal strength, and motion of wearable devices and phones. In block 715, notifications are generated and provided to a user. For example, if a user is taking a day off skiing, they may desire to have text and auditory notifications played on a smartwatch. As another example, the type and modality of notifications is decided automatically each time there's a new notification/call/message coming, with the best effort applied based on, for example, network availability, or user activity. In block 720, the user's commands are received. For example, depending on the capabilities of the user's device and their network accessibility, commands may be entered by voice or by text.

Figure 8:
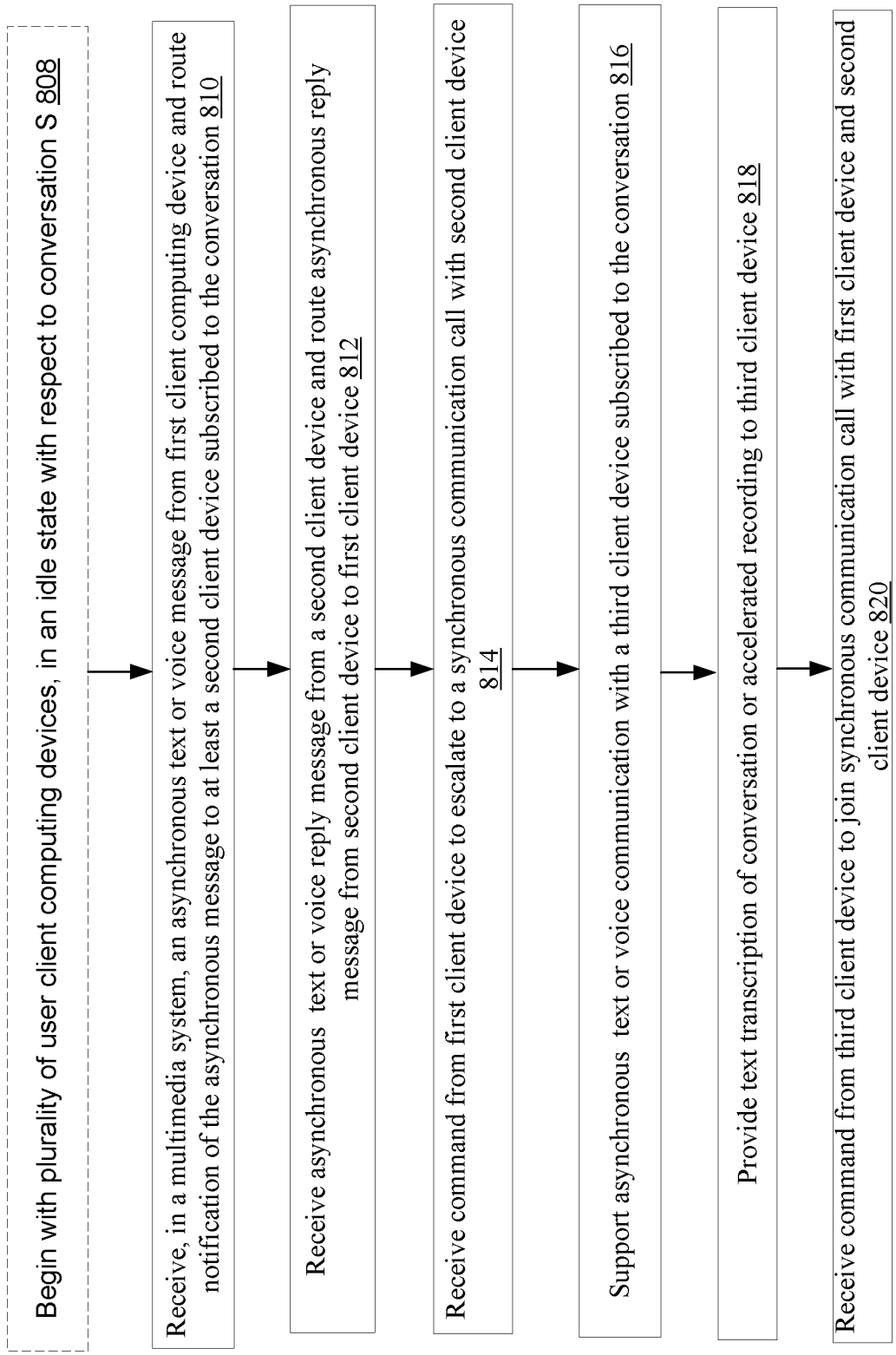
FIG. 8 is a flow diagram of method of operating with three client devices, according to an embodiment of the invention.

FIG. 8 is a flowchart of an example generalizing some of the features of FIG. 6. That is, the example of FIG. 6 is not limited to the particular system and tables described but has more general applications. In block 808, a plurality of user client computing devices are initially in an idle state with respect to a conversation, S. In block 810, an asynchronous text or voice message is received in a multimedia system from a first client computing device. The asynchronous text or voice message is routed to at least a second client device subscribed to the conversation. In block 812, the multimedia system receives an asynchronous text or voice reply message from the second client computing device and routes it to the first client device. In block 814, a command is received from the first client computing device to escalate to a synchronous call with the second client device. Thus, a two-way call occurs between the first client computing device and the second client computing device. As illustrated in block 816, asynchronous text or voice communication is supported with a third client computing device subscribed to the conversation. The third client computing device may, for example, have not been available in earlier steps (e.g., turned off or lacking a network connection) or its user may have been unavailable, busy, or chose not to participate in earlier interactions. In block 818, services may be provided to aid the third user to catch up on the conversation, such as via a text transcript of the call or via an accelerated playback of a recording of the call. In block 820, a command from the third client device is received to join in the synchronous call with the first client device and the second client device. In this example, additional options may be provided for voice commands, notifications, and visual indicators, as previously described in earlier examples.

Figure 9:
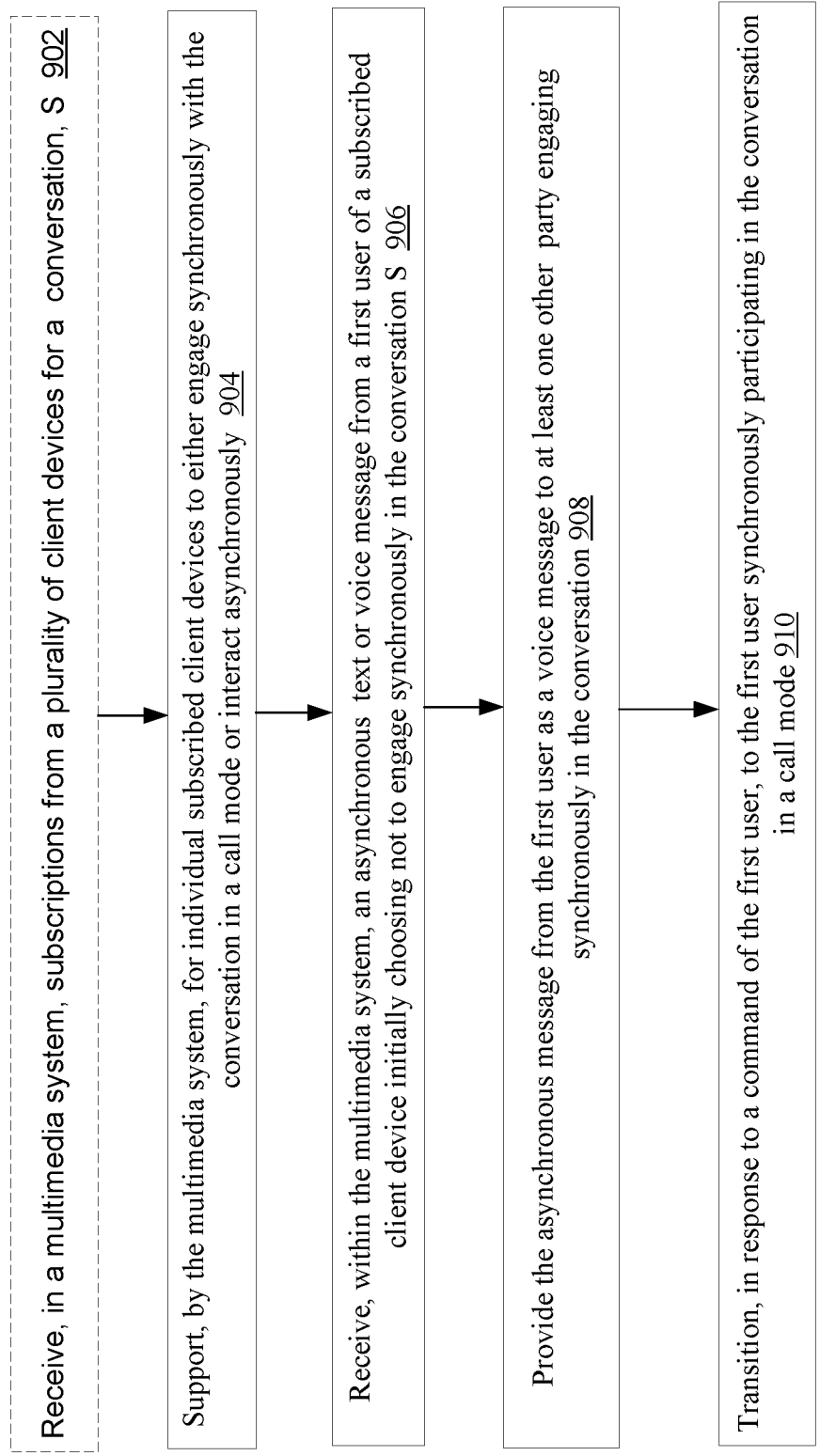
FIG. 9 is a flow diagram of method of operating with at least two client devices, according to an embodiment of the invention.

FIG. 9 is a flow chart of an example with an arbitrary number of client computing devices participating in a conversation. For example, in many businesses, there may be a wide range in the number of people engaged in a conversation. For example, there may be 2, 3, 4, 5, 6, . . . N different users participating in a conversation, where N is a positive integer. There may also be different conversations an individual user can subscribe to or engage in. For example, a manager may participate in a portion of a first synchronous call in a first conversation about a first matter, jump to a different synchronous call in a different conversation about a different matter, then later return to the first conversation.

In block 902, subscriptions are received in a multimedia system from a plurality of client devices for a conversation, S. In block 904, support is provided by the multimedia system for individual client computing devices to either engage synchronously with the conversation in a call mode or interact asynchronously, such as via asynchronous text and voice messages. In block 906, an asynchronous text or voice message from a first user of a subscribed client computing device initially choosing to not engage in a synchronous call in the conversation. In block 908, the asynchronous message from the first user is provided as a voice message to at least one other party engaging in a synchronous call in the conversation. In block 910, in response to a command from the first user, the system transition for the first user to synchronously participate in the conversation in a call mode.

Figure 10:
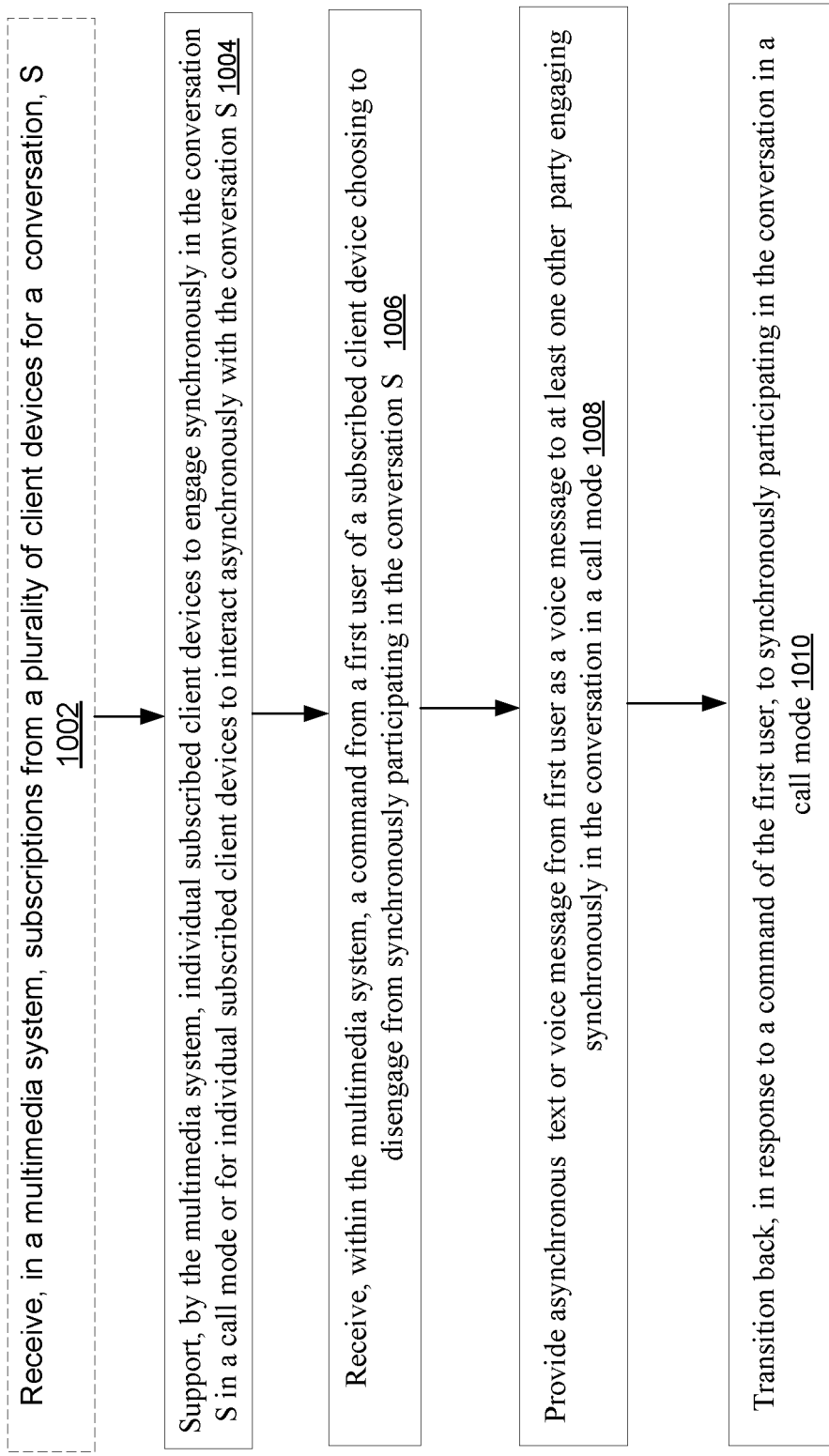
FIG. 10 is a flow diagram of another method of operating with at least two client devices, according to an embodiment of the invention.

FIG. 10 is a flow chart illustrating that it is possible for users to transition back and forth between asynchronous media messaging (e.g, text, voice or video messaging) and a synchronous call mode (where a synchronous call may include voice or voice+video). In block 1002, subscriptions are received in a multimedia system from a plurality of client devices for a conversation, S. In block 1004, support is provided by the multimedia system for individual client computing devices to either engage synchronously with the conversation in a call mode or interact asynchronously, such as via asynchronous text and voice messages. In block 1006, a command is received from a first user of a subscribed client device to disengage from participating in a synchronous call in the conversation S. In block 1008, asynchronous text or voice messages from the first user are provided to at least one other party engaging synchronously in the conversation in a call mode. In block 1010, in response to a command of the first user, a transition is made back to synchronously participating in the conversation in a call mode.

FIG. 11 is a flow chart of a method illustrating an example of the use of notifications. In block 1102, subscriptions are received in a multimedia system from a plurality of client devices for a conversation, S. In block 1104, support is provided by the multimedia system for individual client computing devices to either engage synchronously with the conversation in a call mode or interact asynchronously, such as via asynchronous text and voice messages. In block 1106, the system provides notification to at least one client computing device engaged asynchronously in the conversation when synchronous call communications are initiated between at least two other client computing devices. In block 1108, an option is provided to the at least one client computing devices asynchronously engaged in the conversation to show a transcript of the synchronous call communication or to play an accelerated recording of the synchronous call communication. As examples, accelerated playback may be achieved by using techniques such as changing the time of audio while preserving voice pitch; with the help of speech recognition service, removing periods of silence, disfluencies, parasite words and repetitive words, and allowing users to skip forward to the next sentence, next speaker or next topic. In block 1110, an option is provided to the at least one client computing device engaged asynchronously in the conversation to transition to join in synchronous call communication.

The foregoing description of the embodiments of the present invention has been presented for the purposes of illustration and description. It is not intended to be exhaustive or to limit the present invention to the precise form disclosed. Many modifications and variations are possible in light of the above teaching. It is intended that the scope of the present invention be limited not by this detailed description, but rather by the claims of this application. The disclosed technologies can take the form of an entirely hardware implementation, an entirely software implementation or an implementation containing both software and hardware elements. In some implementations, the technology is implemented in software, which includes but is not limited to firmware, resident software, microcode, etc.

Furthermore, the disclosed technologies can take the form of a computer program product accessible from a non-transitory computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

As will be understood by those familiar with the art, the present invention may be embodied in other specific forms without departing from the spirit or essential characteristics thereof. Likewise, the particular naming and division of the modules, routines, features, attributes, methodologies and other aspects are not mandatory or significant, and the mechanisms that implement the present invention or its features may have different names, divisions and/or formats. Furthermore, as will be apparent to one of ordinary skill in the relevant art, the modules, routines, features, attributes, methodologies and other aspects of the present invention can be implemented as software, hardware, firmware or any combination of the three. Also, wherever a component, an example of which is a module, of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present invention is in no way limited to implementation in any specific programming language, or for any specific operating system or environment. Accordingly, the disclosure of the present invention is intended to be illustrative, but not limiting, of the scope of the present invention, which is set forth in the following claims.

What is claimed is:

1. A system, comprising:
   a voice server;
   a synchronous conference server having a virtual room assigned to each individual conversation hosted by the system;
   the voice server having Bot adapters for bots to coordinate interactions between client applications of a plurality of client computing devices of individual users and at least one asynchronous chat service, a synchronous conferencing service, a transcription service, a text-to-speech service, and an automated speech recognition service;
   the bots of the system configured to coordinate each client computing device of an individual conversation participating in the individual conversation in either a synchronous duplex call mode via the synchronous conferencing service or interacting with the individual conversation via an asynchronous text or voice messaging mode;
   the system supporting individual client devices smoothly transitioning in the individual conversation from the asynchronous text or voice message mode to the synchronous duplex call mode;
   the system further configured for individual client computing devices to smoothly transition from synchronous duplex calling to asynchronous text or voice message engagement with the individual conversation;
   the system supporting user configurable voice commands and auditory notifications of messages and calls;
   system configured to provide complementary modalities for converting text messages to voice messages and converting voice messages to text messages;
   the system plays message notifications in a configured message notification modality of each user;
   wherein in response to a voice command of a user of a particular client device that is part of the individual conversation, the system escalates from asynchronous text or voice message mode of the client computing device of the user with the individual conversation to participation in the synchronous duplex call mode;
   wherein in response to a command or a network problem of a user of a particular client device that is part of the synchronous duplex call, the system de-escalates the synchronous duplex call to an asynchronous mode of the client computing device of the user with the individual conversation;
   wherein a transcription of a synchronous duplex call of the individual conversation is generated that is accessible by client computing devices operating in the asynchronous text or voice messaging mode;
   wherein a recording of a synchronous duplex call of the individual conversation is provided to client computing devices operating in the asynchronous text or voice messaging mode, the recording having an accelerated playback mode; and
   wherein the system supports client device voice modes comprising an idle mode, a new message being recorded mode, a voice notification being played mode, a reply message being recorded in response to a notification mode, and a full duplex call start mode.

2. The system of claim 1, wherein the system is configured to provide complementary modalities for converting text messages to voice messages and converting voice messages to text messages.

3. The system of claim 1, wherein the system plays message notifications in the configured message notification modality of each user.

4. The system of claim 1, wherein in response to a command detected in captured audio at an individual client computing device, the system performs at least one of 1) ceasing the playing a notification sound and voiceover in response to message from another client computing device, 2) recording/streaming a reply to the message, and 3) escalating the communication into a full-duplex call mode with the at least one other client computing device.

5. The system of claim 1, wherein a transcription of a synchronous duplex call of a conversation is generated that is accessible by client computing devices operating in the asynchronous text or voice messaging mode.

6. The system of claim 1, wherein a recording or a live stream of a synchronous duplex call of a conversation is provided to client computing devices operating in the asynchronous text or multimedia messaging mode, the recording or the live stream having an accelerated playback mode with ability to catch up and smoothly transition into a live synchronous call.

7. The system of claim 1, where the system supports voice commands for each of the client device voice modes.

8. The system of claim 1, wherein the system supports event sounds for each client voice mode.

9. The system of claim 1, wherein the system determines, for each individual client computing device associated with a conversation, device capability, network accessibility, and user preferences for participating in the individual conversation and determining whether each individual client computing device is to participate in the conversation as a live synchronous call or via asynchronous text or voice messaging.

10. The system of claim 1, wherein for each individual client computing device, the system generates auditory user notifications regarding the conversation according to each user configuration preference.

11. The system of claim 1, wherein the system is configured to receive voice commands of each user to navigate participation in the individual conversation.

12. The system of claim 1, further comprising: the system supporting live streaming of a synchronous duplex call with a controlled live streaming delay and voice acceleration capability to facilitate individual client computing devices transitioning in the individual conversation from the asynchronous text or multimedia messaging mode to the synchronous duplex call mode.

13. A system, comprising:
a voice server;
a synchronous conference server having a virtual room assigned to each individual conversation hosted by the system;
the voice server having Bot adapters for bots to coordinate interactions between client applications of a plurality of client computing devices of individual users and at least one asynchronous chat service, a synchronous conferencing service, a transcription service, a text-to-speech service, and an automated speech recognition service;
the bots of the system configured to coordinate each client computing device of an individual conversation participating in the individual conversation in either a synchronous duplex call mode via the synchronous conferencing service or interacting with the individual conversation via an asynchronous text or voice messaging mode;
the system supporting individual client computing devices smoothly transitioning in the individual conversation from the asynchronous text or voice message mode to the synchronous duplex call mode;
the system further configured for individual client computing devices to smoothly transition from synchronous duplex calling to asynchronous text or voice message engagement with the individual conversation;
the system supporting user configurable voice commands and auditory notifications of messages and calls;
the system configured to provide complementary modalities for converting text messages to voice messages and converting voice messages to text messages; and
the system plays message notifications in the configured message notification modality of each user.

14. A system, comprising:
a voice server;
a synchronous conference server having a virtual room assigned to each individual conversation hosted by the system;
the voice server having Bot adapters for bots to coordinate interactions between client applications of a plurality of client computing devices of individual users and at least one asynchronous chat service, a synchronous conferencing service, a transcription service, a text-to-speech service, and an automated speech recognition service;
the bots of the system configured to coordinate each client computing device of an individual conversation participating in the individual conversation in either a synchronous duplex call mode via the synchronous conferencing service or interacting with the individual conversation via an asynchronous text or voice messaging mode;
the system supporting individual client devices smoothly transitioning in the individual conversation from the asynchronous text or voice message mode to the synchronous duplex call mode;
the system further configured for individual client computing devices to smoothly transition from synchronous duplex calling to asynchronous text or voice message engagement with the conversation;
the system supporting user configurable voice commands and auditory notifications of messages and calls;
the system configured to provide complementary modalities for converting text messages to voice messages and converting voice messages to text messages;
the system plays message notifications in a configured message notification modality of each user;
wherein in response to a client computing device voice command of a user of a particular client computing device that is part of the individual conversation, the system escalates from asynchronous text or voice message mode of the client computing device of the user with the individual conversation to participation in the synchronous duplex call mode;
wherein a transcription of a synchronous duplex call of a conversation is generated that is accessible by client computing devices operating in the asynchronous text or voice messaging mode;
wherein a recording of a synchronous duplex call of a conversation is provided to client computing devices operating in the asynchronous text or voice messaging mode, the recording having an accelerated playback mode; and
wherein the system supports client computing device voice modes comprising an idle mode, a new message being recorded mode, a voice notification being played mode, a replay message being recorded in response to a notification mode, and a full duplex call start mode;
wherein a plurality of modes of communication between at least three client computing devices are supported, the plurality of modes including an idle mode, a first mode in which the at least three client computing devices initiate a conversation by text messaging, a second mode in which at least one client computing device of the at least three client computing devices makes a voice reply to a text message of the conversation, a third mode in which at least one client computing device of the ate least three client computing devices escalates a voicemail reply to a live 2-way call with one of the other at least three client computing device, a fourth mode in which there is a 2-way call of two client computing devices of the at least three client devices of the conversation with a third client computing device listening in to a recording of the call, a fifth mode in which a voice reply of the third client computing device is accessible in the 2-way call, and a sixth mode in which a 3-way call is initiated between the first client computing device, the second client computing device, and the third client computing device.

15. The system of claim 14, wherein in response to a command of a user of a particular client computing device that is part of the synchronous duplex call, the system de-escalates the synchronous duplex call to an asynchronous text or voice message mode of the client computing device of the user with the individual conversation.

16. The system of claim 14, wherein in response to a network problem of a user of a particular client computing device that is part of the synchronous duplex call, the system de-escalates the synchronous duplex call to an asynchronous text or voice message mode of the client computing device of the user with the individual conversation.

* * * * *